US012805510B2

(12) United States Patent
Tanner

(10) Patent No.: US 12,805,510 B2
(45) Date of Patent: Nov. 24, 2026

(54) SPOT SPRAYING METHOD AND SYSTEM FOR HIGH PRECISION APPLICATION OF AGROCHEMICALS

(71) Applicant: EcoRobotix SA, Yverdon-les-Bains (CH)

(72) Inventor: Steve Tanner, Essert-Pittet (CH)

(73) Assignee: EcoRobotix SA, Yverdon-les-Bains (CH)

( * ) Notice: Subject to any disclaimer, the term of this patent is extended or adjusted under 35 U.S.C. 154(b) by 346 days.

(21) Appl. No.: 18/282,175

(22) PCT Filed: Feb. 22, 2022

(86) PCT No.: PCT/IB2022/051543
§ 371 (c)(1),
(2) Date: Sep. 14, 2023

(87) PCT Pub. No.: WO2022/195380
PCT Pub. Date: Sep. 22, 2022

(65) Prior Publication Data
US 2024/0147982 A1 May 9, 2024

(30) Foreign Application Priority Data
Mar. 18, 2021 (CH) ................................ CH00289/21

(51) Int. Cl.
*A01M 7/00* (2006.01)

(52) U.S. Cl.
CPC ........ *A01M 7/0096* (2013.01); *A01M 7/0071* (2013.01)

(58) Field of Classification Search
CPC .... A01M 7/00; A01M 7/0089; A01M 7/0071; A01M 7/0096; A01M 7/0049;
(Continued)

(56) References Cited

U.S. PATENT DOCUMENTS 4,519,542 A * 5/1985 Johnston ............. A01M 7/0042 239/155
4,539,842 A * 9/1985 McCollum .......... A01M 7/0096 73/865.9
(Continued)

FOREIGN PATENT DOCUMENTS

CN 108157339 A 6/2018
CN 112219824 A 1/2021
(Continued)

OTHER PUBLICATIONS

International Search Report and Written Opinion for PCT/IB2022/051543 mailed Aug. 24, 2022, 22 pages.

*Primary Examiner* — Steven M Cernoch
*Assistant Examiner* — Anna Thi Ho
(74) *Attorney, Agent, or Firm* — BLANK ROME LLP

(57) ABSTRACT

The present invention relates to a method of selectively spraying an area of a cultivated field (10) with an agriculture spraying vehicle. The vehicle comprises a spraying equipment (200) having at least one imaging system (210), and at least one trailing spray bar (300) comprising a plurality of electromechanical nozzles (310) spaced apart from each other by a constant pitch distance. The plurality of electromechanical nozzles (310) includes a corresponding plurality of nozzles (314) and of electromechanical valves (312). The agriculture spraying equipment (200) further comprises a control unit (220) including a processing unit to control the electromechanical valve (312) of each electromechanical nozzle (310). The method comprises: i) acquiring, by the at least one imaging system (210), an image of an area of the cultivated field (10) and differentiating on the image, by the processing unit, a plant (14) to be sprayed from a plant (12) which shall not be sprayed; ii) determining at least one nozzle (350) which is about to be substantially vertically positioned above a plant (14) to be sprayed; iii) computing
(Continued)

a spraying pattern on the area based on the divergence angle of said at least one nozzle (350) and the vertical distance between said nozzle (350) and said area to be selectively sprayed, said spraying pattern covering the plant (14) to be sprayed and possibly touching a plant (12) which shall not be sprayed; iv) computing a distance called the jet shift distance (354) to laterally shift the spraying pattern such that the shifted pattern covers the plant (14) to be sprayed without covering the plant (12) which shall not be sprayed, and express said jet shift distance (354) as a multiple of said nozzle-to-nozzle pitch, and v) laterally shifting said spraying pattern by shifting the at least one nozzle (350) vertically positioned above a plant to be sprayed (14) by said jet shift distance (354) so that the spraying pattern from the at least one newly selected nozzle (352) does not spray the plant that shall not be sprayed (12).

11 Claims, 10 Drawing Sheets

(58) Field of Classification Search
CPC .... A01G 25/16; A01G 25/162; A01G 25/165; B05B 1/02; B05B 1/04; B05B 1/10; B05B 1/12; B05B 1/20; B05B 3/021; B05B 13/00; B05B 13/005; B05B 13/02
USPC .............................................................. 239/1
See application file for complete search history.

(56) References Cited

U.S. PATENT DOCUMENTS 4,842,195 A * 6/1989 Koll ...................... A01M 7/006 239/176
5,248,090 A * 9/1993 Williamson ........ A01M 7/0064 239/168
5,507,435 A * 4/1996 Benest ................ A01M 7/0057 239/167
5,520,333 A 5/1996 Tofte
5,704,546 A * 1/1998 Henderson .......... A01M 7/0089 239/69
5,971,294 A * 10/1999 Thompson .............. B05B 12/04 239/69
6,036,107 A * 3/2000 Aspen ................... B05B 9/0423 137/884
6,375,089 B1 * 4/2002 Taylor ................. A01M 7/0042 239/164
7,311,004 B2 * 12/2007 Giles ................... A01M 7/0096 239/176
9,655,356 B1 * 5/2017 Lytle, Jr. ............... A01M 17/00
10,390,481 B1 8/2019 Brown et al.
10,575,460 B2 3/2020 Davis et al.
10,772,253 B2 9/2020 Calleija et al.
11,399,531 B1 * 8/2022 Sibley ................. A01M 7/0089
2003/0111546 A1 * 6/2003 Schaffter ............. A01M 7/0089 239/69
2010/0032492 A1 2/2010 Grimm et al.
2011/0204157 A1 * 8/2011 Tian ...................... B05B 1/3006 239/71
2012/0195496 A1 8/2012 Zaman et al.
2015/0375247 A1 * 12/2015 Funseth .................... B05B 1/20 239/69
2016/0215461 A1 * 7/2016 Hays ..................... E01C 19/176
2016/0368011 A1 * 12/2016 Feldhaus ............... B05B 12/124
2019/0124826 A1 * 5/2019 Pickett ................... A01C 23/02
2019/0150357 A1 5/2019 Wu et al.
2020/0045953 A1 2/2020 Serrat et al.
2020/0107537 A1 * 4/2020 Brown ................ A01M 7/0089
2021/0090274 A1 3/2021 Fu et al.
2021/0127567 A1 * 5/2021 Loukili ............... A01M 7/0042
2021/0378228 A1 12/2021 Klemann et al.
2021/0379617 A1 * 12/2021 Chapple ................... B64D 1/18
2022/0183265 A1 * 6/2022 Kocer ................. A01M 7/0089
2022/0340277 A1 * 10/2022 Faers ....................... G05D 1/46
2024/0397928 A1 * 12/2024 Sandbrook ............ G01S 17/894

FOREIGN PATENT DOCUMENTS

DE 102017220034 A1 * 5/2019 .......... A01M 7/0089
DE 102018126585 A1 4/2020
DE 102018221468 A1 6/2020
DE 102019203394 A1 * 9/2020 .......... A01M 7/0089
DE 102020108500 A1 * 9/2021 ........... B05B 12/126
EP 0574740 A1 12/1993
EP 2995382 A1 3/2016
EP 3539376 A1 9/2019
EP 3649857 A1 5/2020
EP 3708001 A1 9/2020
FR 3090270 A1 6/2020
WO WO-2019091835 A1 * 5/2019 .......... A01M 7/0096
WO 2020182711 A1 9/2020

* cited by examiner

SPOT SPRAYING METHOD AND SYSTEM FOR HIGH PRECISION APPLICATION OF AGROCHEMICALS

RELATED APPLICATIONS

This application is a national phase of PCT/IB2022/051543, filed on Feb. 22, 2022, which claims priority to Switzerland Patent Application No. 00289/21, filed on Mar. 18, 2021. The contents of these applications are hereby incorporated by reference in their entirety.

FIELD OF THE INVENTION

The present invention concerns the field of agriculture plant treatment and more particularly a method for selective application using high precision and high resolution spot spraying.

DESCRIPTION OF RELATED ART

Spot spraying is the ability to apply droplets of liquids on specific and predetermined locations. This approach has recently emerged as a way to drastically reduce the quantity of pesticides in agriculture. Indeed, the application of chemicals in agriculture is currently done with nozzles in continuous operation. Every object on the trajectory of a nozzle is sprayed. Although they can contribute to doses reduction and optimization, modulation techniques, such as nozzle flow control with PWM, do not fundamentally change the problem of standard sprayers which use untargeted application. Spraying chemicals everywhere is an inefficient process, leading to higher costs, higher chemical residues in soil and plants, damages on biodiversity, damages on crop yield due to phyto-toxicity, higher volumes of water to be transported, etc.

With spot spraying, the nozzles are equipped with electromechanically controlled valves which can switch on/off the flow very rapidly. The flow is off by default, and is switched on only when a target is to be sprayed. This allows drastic reduction of chemicals, and therefore of costs. The chemical residues are strongly reduced, as well as water and soil contamination, and damage on biodiversity. Finally, as the crop is marginally sprayed, the phyto-toxicity due to limited selectivity is strongly reduced, leading to healthier crop plants with better pests resistance, thereby leading to a higher crop yield.

In any spraying application, whether continuous or spot spraying, two key parameters must be controlled to guarantee the effect of the application. The first is the size of the droplets, which has a fundamental effect on the way the liquid interacts with the target. For most of the applications on plants, the desired effect is the absorption of the liquid (or, more precisely, the absorption of the active molecules carried by the transport liquid which is universally water) by the plant leaves. To get good absorption, the droplets must be of a controlled size. Too small, they get evaporated in the air before reaching their target, or drifted away by the wind. Too big, they roll over the plant without penetrating it. The second parameter is the doses or volume of liquid applied per unit area.

Two parameters influence the droplet size: the pressure of spraying (the higher, the more speed the liquid has, and the more fragmented and small the droplets are) and the geometry of the nozzle (angle of divergence, spray pattern shape, flow rate, nozzle outlet geometry, etc.). Normally, these parameters cannot be changed on the fly since the nozzle is machined and fixed: the divergence angle and flow rate are fixed and influenced only by pressure. The pressure is normally constant and fixed to a value generating ideal droplet size. The nozzles can be normally changed on a machine to adapt for various applications with various droplet sizes and application rates. For this, systems with manual or automatic switching between several different nozzles have been developed. But these changes are usually done from one field to another, or one crop to another, or one application kind to another (herbicide, fungicide, etc), but during a field operation, nozzles are fixed.

In conventional agriculture spraying applications, the nozzles are placed on a spray bar aligned orthogonally to the direction of displacement of the vehicle on which it is mounted, and parallel to the surface to be sprayed. The nozzles feature a divergent spray angle so as to apply homogeneously the liquid on the surface to be sprayed, generally the ground, but it can also be the foliage of a vertical plant sprayed laterally. Nozzles are usually separated to each other by a uniform pitch distance. Their divergent jet will allow to apply the liquid on a given surface, which depends on the distance from nozzle to the target (usually the height distance from nozzle to the ground or plants).

Usually, this height is chosen so that the application width corresponds to the nozzle-to-nozzle distance, resulting in no jet overlap and no missed zone. But the application distance, usually the height, can also be increased, and in this case adjacent nozzle jets will overlap. The applied doses per unit area depends therefore not only on the flow rate of each nozzle, but also on the density of nozzles per unit length given by the nozzle-to-nozzle pitch distance. The height will influence the overlap but not the doses. Obviously, the dose will depend also inversely proportionally to the speed of the vehicle.

The control of applied liquid per unit area has a fundamental importance in the efficiency of the application. With a spray configuration with constant and fixed nozzle flow, and fixed nozzle to nozzle distance, the only remaining control parameter is the speed of the vehicle. In practice, this is the preferred control parameter when the farmer wants to modify the applied doses per unit area. Indeed, he cannot change easily the nozzles, neither their density (nozzle-to-nozzle pitch distance) on the spray bar, neither the service pressure, neither the recommended application rate of the mixture. He can also play a bit on the dilution of the active ingredient, but within margins specified by the chemistry fabricant and the operating conditions (temperature and humidity).

Several decades ago, pulse width modulation (PWM) was introduced on sprayers to allow better dose control. In this technique, electro-mechanically actuated valves are placed before each nozzle, allowing to rapidly switch on/off their flow. The duty cycle of the jets (the duration of jet opening over total duration) can be varied from a minimum level to the full nozzle opening, so as to modify the average applied nozzle flow rate. In order to get homogeneous application, this process must occur at relatively high commutation frequencies, the limit being the opening and closure speed of the valve controlled electro-mechanically. This technique allows to have at disposal another parameter to control the flow rate and therefore the dose per unit area, independently from the sprayer speed. This has been possible, for instance, to take into account the radius of a U-turn with the sprayer to reduce the flow on the inside of the spray bar and increase it on the outside to keep homogeneous application rate over the whole ground.

Contrary to the above-described conventional spray application, where the liquid is applied everywhere in a homogeneous way, and in which all the nozzles are spraying together, in spot spraying application the liquid is applied only on some identified targets, which can be a part of a plant, a complete plant, a group of plant, or part of ground, or other object. For this, in order to control with high accuracy where the product is applied, the system must position the nozzle at an exact location, and perform a very short spray operation, which is a pulse of given duration, the duration influencing the applied doses. If the jet is diverging, which is the case if small droplets are desired, then the divergence angle, the distance to a target and the shape of the nozzle pattern will determine the size of the sprayed spot, and its shape. Placing the nozzle near the target will result in a small spot, but high doses per unit area. Placing the nozzle at a larger distance will result in bigger spot, but lower doses per unit area.

If the machine is moving, then the movement will modify the applied doses per unit area. For instance, let us consider a square spray pattern of 5×5 cm, and a spray pulse duration of 25 ms. If the machine is moving at 2 m/s, the square won't be square any more because the spray will move of 5 cm during the 25 ms of the pulse. The spot will measure 5×10 cm, and therefore the dose per unit area will be divided by two, in average. Another effect of the movement is that the nozzles must be opened before passing vertically over the target, taking into account the time it needs for the flow to fly from the nozzle to the target. This time will amount to the spray distance divided by the jet speed. The same amount of time must be used to anticipate the opening of the nozzle before it passes vertically over its target. Due to the vehicle movement, this time translates into an anticipated distance which equals the time multiplied by the vehicle speed.

To position the nozzle with accuracy for spraying, a control of its lateral and longitudinal position is necessary. In longitudinal direction (direction aligned with the movement of the vehicle), the position of the spray action will be determined only by correct timing between image acquisition (from which the position of the targets are identified) and spraying. By controlling the exact moment of opening of the jet, one controls exactly its position, knowing the speed of the vehicle. Lateral positioning could be controlled by moving laterally the nozzles. In practice, this is complex to achieve, and an array of fixed, dense nozzles is preferred. The pitch, or distance between two adjacent nozzles is important, because it will define the possible discrete positions of the jets. Their positioning accuracy referred to ground or to the plants can be much higher than the pitch, but the possible locations of a jet will be defined by the placement of the nozzles along the spray bar. Obviously, the smaller the pitch is, the better is the control of the jet lateral position.

In short, dose control, or quantity of applied liquid per unit area, is important for any spraying application. In conventional sprayers, the nozzles lateral density, flow rate and pressure being fixed, the dose can be controlled only by the speed of the nozzles over the ground. Adding PWM control of the nozzle flow allows to control the dose independently from the vehicle speed. For spot spraying, two more parameters influence the dose. The first is the duration of the impulsion opening, and the second is the height from nozzle to ground.

In any sprayer, a common problem is the clogging of the nozzles, which is facilitated with small flow rate nozzles. To prevent clogging, the usual method is to use filters to retain the particles with sufficient size to block the flow. These filters are used either on a per nozzle basis or at the pressure system level, or at both locations. An easy and ideally automatic detection of nozzle clogging is important for reliable spraying operation, as a clogged nozzle may not be easily observable by the farmer, and may happen at any moment.

Finally, the control of the applied doses may be efficiently implemented, but a measurement of the applied doses, whether direct or indirect, is desired to provide information to the sprayer user and to guarantee that the authorized doses per unit area is respected. Direct doses measurement will measure the applied liquid volume, and knowing the area processed by the machine, will calculate the applied doses per unit area. Indirect doses measurement will count the time nozzles have been opened, and will extrapolate the applied quantity based on the known nozzles flow rates.

EP 3539376 A1 describes a spraying system for the control of the doses used in a conventional spraying system (continuous spraying), in which two nozzles are used together and are spraying the same area, one with constant flow, and the other with variable flow, modulated with PWM. The PWM ratio is controlled in function of the ramp height and the pressure of the system so as to guarantee the desired flow rate, which is also measured.

U.S. Ser. No. 10/390,481 B1 describes a spraying system in which multiple spray bars equipped with a combination of nozzles can be assembled to overlap each other or not.

EP 2995382 A1 describes the combination of several nozzles controlled by electro valves and working in combination to provide a wide range of spray flow. The system combines continuous and PWM operation of two combined nozzles, aligned in the forward direction of the spray. It also uses jet overlap of adjacent nozzles to modulate the flow. An algorithm of mode selection is implemented to control deposition rate taking into account vehicle speed, desired application rate, modulation map, bar height. By controlling the number of active nozzles, the duty cycle, the nozzle mode (continuous/PWM), the flow rate can be controlled on a wide range and compensate for pressure or speed fluctuations. All these settings are operated in a continuous flow mode.

US 2010032492 A1 describes a system for the control of the sprayed flow, using PWM on each nozzle individually, and calculating the duty cycle in function of a plurality of parameters such as vehicle speed, bar height, turn radius, modulation map, etc.

These systems have the disadvantage to spray chemicals on areas of cultivated field in a homogeneous manner resulting in high chemical residues in soil and plants leading to damages on biodiversity and crop yield.

BRIEF SUMMARY OF THE INVENTION

An aim of the present invention is therefore to provide a method of selectively spraying a cultivated field as a function of the nature of the plants, allowing to spray some defined plants and avoiding spraying some other defined plants.

Another aim of the present invention is to provide a method to detect clogging in the spray nozzles of an agriculture spraying system.

These aims are achieved notably by means of a method of selectively spraying an area of a cultivated field with an agriculture spraying vehicle. The vehicle comprises a spraying equipment having at least one imaging system, and at least one trailing spray bar aligned along a direction perpendicular to the direction of the agriculture spraying vehicle when operating. The trailing spray bar comprises a plurality of electromechanical nozzles spaced apart from each other by a constant pitch distance and configured to selectively spray said area. The plurality of electromechanical nozzles includes a corresponding plurality of nozzles and a corresponding plurality of electromechanical valves. The agriculture spraying equipment further comprises a tank and pressure system and a control unit including a processing unit to control the electromechanical valve of each electromechanical nozzles. The method comprises: i) acquiring, by the at least one imaging system, an image of an area of the cultivated field and differentiating on the image, by the processing unit, a plant to be sprayed from a plant which shall not be sprayed; ii) determining at least one nozzle which is about to be substantially vertically positioned above a plant to be sprayed; iii) computing a spraying pattern on the area based on the divergence angle of said at least one nozzle and the vertical distance between said nozzle and said area to be selectively sprayed, said spraying pattern covering the plant to be sprayed and possibly touching a plant which shall not be sprayed; iv) computing a distance called the jet shift distance to laterally shift the spraying pattern such that the shifted pattern covers the plant to be sprayed without covering the plant which shall not be sprayed, and expressing said jet shift distance as a multiple of said nozzle-to-nozzle pitch, and v) laterally shifting said spraying pattern by shifting the at least one nozzle vertically positioned above a plant to be sprayed by said jet shift distance so that the spraying pattern from the at least one newly selected nozzle does not spray the plant that shall not be sprayed.

In an embodiment, the mask defining the plant to be sprayed is radially extended in all direction by a distance to determine an extended zone to be sprayed to ensure that the corresponding plant will be correctly sprayed even in the presence of inaccuracy in the lateral position of the selected nozzle(s) or in the opening and closing moment of the nozzle(s).

In an embodiment, the mask defining the plant to be sprayed is radially reduced in all directions by a predetermined distance to determine a reduced zone to be sprayed to ensure that the spraying pattern is contained inside the corresponding plant to be sprayed even in the presence of inaccuracy in the lateral position of the selected nozzle(s) or in the opening and closing moment of the nozzle(s).

In an embodiment, lateral opposite sides of the extended zone or reduced zone are reduced by a distance corresponding to said lateral jet shift distance to determine a laterally reduced spraying zone to ensure that the lateral jet divergence does not cause the spraying pattern to fall outside the radially extended zone or reduced zone corresponding to the plant to be sprayed.

In an embodiment, a buffer zone is computed around the plant which has been identified by the at least one imaging system as a plant that shall not be sprayed. The buffer zone crops a portion of the reduced spraying zone to determine a further reduced spraying zone.

In an embodiment, the control unit selects and opens one or more electromechanical valves of electromechanical nozzles as a function of: i) said shifted pattern, ii) the speed of the agriculture spraying vehicle, iii) the height of the spray bar above the cultivated field, iv) the pressure of the liquid in the spray bar provided by the pressure system, and v) the volume per unit area to be applied.

In an embodiment, the electromechanical valves of the plurality of electromechanical nozzles are controlled to open the spray nozzles to apply a dose volume ranging from 25% to 100% of the total doze according the either of the following configurations: a. all nozzles of the spray bar are opened to spray 100% of the total dose; b. every three adjacent spray nozzles of the spray bar are opened, wherein one spray nozzle is closed between each of said every three adjacent spray nozzles to spray 75% of the total dose; c. every two adjacent spray nozzles of the spray bar are opened, wherein one spray nozzle is closed between each of said every two adjacent spray nozzles to spray 66% of the total dose; d. every one out of two adjacent nozzles of the spray bar are opened to spray 50% of the total dose; e. every one out of three adjacent spray nozzles of the spray bar are opened to spray 33% of the total dose, and f. every one out of four adjacent spray nozzles of the spray bar are opened to spray 25% of the total dose.

In an embodiment, the selection and opening of said one or more electromechanical valves of the corresponding nozzle(s) is combined with PWM to open the nozzle(s) so as to further modulate the spraying dose in order to increase the accuracy of the total applied volume per unit area.

In an embodiment, the selection and opening of said one or more electromechanical valves of the corresponding nozzle(s) periodically change between successive PWM pulses so as to obtain an interleaved spot spray pattern with an improved application homogeneity.

In an embodiment, one of two adjacent nozzles is open during a first PWM pulse while the other of said two adjacent nozzles is open during a second PWM pulse.

In an embodiment, the spraying equipment comprises at least two spray bars arranged parallel to each other. Each spray bar comprises a plurality of electromechanical nozzles. The plurality of nozzles of each spray bar are spaced apart from each other by a constant pitch distance. One spray bar is laterally shifted from the other spray bar by a distance equals to half of said pitch distance.

In an embodiment, the spraying equipment comprises at least three spray bars arranged parallel to each other. Each spray bar comprises a plurality of electromechanical nozzles. The plurality of nozzles of each spray bar are spaced apart from each other by a constant pitch distance. One spray bar is laterally shifted from one of the two other spray bars by a distance equals to a third of said pitch distance while said one spray bar is laterally shifted from the other of said two other spray bars by a distance equals to two thirds of said pitch distance.

Another aspect of the invention relates to a method of selectively spraying an area of a cultivated field with an agriculture spraying vehicle comprising a spraying equipment. The spraying equipment has at least one imaging system and at least two spray bars arranged parallel to each other. Each spray bar comprises a plurality of electromechanical nozzles including a corresponding plurality of nozzles and a corresponding plurality of electromechanical valves. The plurality of nozzles of each spray bar are spaced apart from each other by a constant pitch distance. One spray bar is laterally shifted from the other spray bar by a distance equals to half of said pitch distance. The agriculture spraying equipment further comprises a tank and pressure system per spray bar, and a control unit including a processing unit to control the electromechanical valve of each electromechanical nozzles of each spray bar. The method comprises: i) operating one of the two spray bars in a first mode where both spray bars are independent from each other and each spray bar sprays a different product at a different location, or ii) operating the two spray bars in a second mode where the two spray bars are combined together and considered as a single bar with a doubled lateral spatial nozzle density, spraying the same product.

In an embodiment, the spraying equipment comprises at least three spray bars arranged parallel to each other, each spray bar comprising a plurality of electromechanical nozzles. The plurality of nozzles of each spray bar are spaced apart from each other by a constant pitch distance. One spray bar is laterally shifted from one of the two other spray bars by a distance equals to a third of said pitch distance while said one spray bar is laterally shifted from the other of said two other spray bars by a distance equals to two thirds of the pitch distance.

Another aspect of the invention relates to a method of determining clogging of spray nozzles of an agriculture spraying system. The agriculture spraying system comprises a tank and pressure system, a main electromechanical valve mounted downstream the tank and pressure system, and a spray bar comprising a plurality of electromechanical nozzles including each a nozzle and an electromechanical valve downstream the main electromechanical valve. The spray bar comprises a conduit extending from the main electromechanical valve and leading to each electromechanical valve of said plurality of electromechanical nozzles, a pressure buffer in fluid communication with the conduit of the spray bar, and a pressure sensor arranged to measure the pressure inside said conduit. The method comprises: a. closing any electromechanical valve of the plurality of electromechanical nozzles if in an open state; b. isolating the spray bar from the tank and pressure system by closing the main electromechanical valve; c. measuring the pressure p1 inside the spray bar; d. actuating an electromechanical valve to open a single electromechanical nozzle k for a fixed period, and e. measuring the pressure p2 inside the spray bar. If the difference between the pressure p1 measured in step c. and the pressure p2 measured in step e. is above a given threshold depending on the absolute pressure p1, the nozzle k is considered as unclogged. If said difference is below said given threshold the nozzle k is considered as at least partially clogged.

In an embodiment, step c. to step e. is repeated for each nozzle (k+1; . . . ; K+i . . . ; k+n) of said plurality of electromechanical nozzles.

In an embodiment, if the pressure p2 measured in step e. is below a predetermined minimal pressure, the main electromechanical valve is open to fill up the pressure buffer before repeating steps c to e.

In an embodiment, the pressure buffer is an elastic pressure buffer element with proportional and known relationship between the pressure in the buffer and the volume of liquid stored in the buffer.

Another aspect of the invention relates to an agriculture spraying vehicle comprising an agriculture spraying system. The agriculture spraying system comprises a tank and pressure system, a main electromechanical valve mounted downstream the tank and pressure system, and a spray bar comprising a plurality of electromechanical nozzles including each a nozzle and an electromechanical valve downstream the main electromechanical valve. The spray bar comprises a conduit extending from the main electromechanical valve and leading to each electromechanical valve of said plurality of electromechanical nozzles, a pressure buffer in fluid communication with the conduit of the spray bar, and a pressure sensor arranged to measure the pressure inside said conduit. The agriculture spraying vehicle further comprises a control unit having a processor configured to execute the method as described above, and a display unit for displaying clogging information for each nozzle.

Another aspect of the invention relates to a method for controlling the applied volume per unit area on a cultivated field of an agriculture spraying vehicle moving over said cultivated field for selective spot spraying application. The agriculture spraying vehicle comprises a spot spraying equipment. The equipment comprises an imaging system and a trailing spray bar aligned perpendicularly to the movement of the equipment. The spray bar comprises a plurality of electromechanical nozzles spaced apart from each other by a constant pitch distance. The plurality of electromechanical nozzles includes each a nozzle and an electromechanical valve. The spraying equipment further comprises a tank and pressure system with pressure sensor, a control unit to process images and control the electromechanical valve of each electromechanical nozzle, and a spray bar height control unit to place the nozzles at a desired distance from the objects to be sprayed. The method comprises: i) acquiring, by the at least one imaging system, an image of an area of the cultivated field and differentiating on the image, by the processing unit, a plant to be sprayed from a plant which shall not be sprayed to obtain a segmented image with masks to be sprayed and masks not to be sprayed; ii) based on the desired volume per unit area to be applied, on the vehicle speed and on the liquid pressure, determining a density of active nozzle per unit length, and determining a vertical distance from nozzle to the target to guarantee constant jet overlap; iii) modulating the flow of opened nozzles with a PWM ratio to obtain the desired volume per unit area to be applied, iv) selecting the highest distance between a spray bar minimal height defined by the user and said determined vertical distance from nozzle to the target; v) moving the spray bar with the spray bar height control unit so as to position the nozzles at said determined vertical distance from nozzle to the target; vi) computing a lateral jet shift distance corresponding to half the spray spot width at the ground and based on the divergence angle of the nozzle, on said liquid pressure and on said highest vertical distance previously selected; vii) from an input segmented plant image containing masks of plants to be sprayed and masks of plants not to be sprayed, extending the masks of plants to be sprayed by a predetermined distance to obtain an extended mask to be sprayed; viii) reducing laterally the size of said extended masks to be sprayed with said computed lateral jet shift distance to obtain reduced masks to spray; ix) defining a nozzle activation map by the intersection of the spray bar nozzles trajectories with the masks to spray, further taking into account said opened nozzles and said PWM ratio, and x) transforming said nozzle activation map into time varying electromechanical valve state vectors, and applying signals to the electromechanical valves based on said time varying electromechanical valve state vectors.

In an embodiment, the method further applies a buffer zone extending radially in all direction around a mask of a plant which shall not be sprayed to obtain masks not to spray.

In an embodiment, the laterally reduced masks to spray are further cropped by the extended masks not to spray resulting from the extension of the mask of the plant not to spray by a buffer distance, prior to defining said nozzle activation map.

BRIEF DESCRIPTION OF THE DRAWINGS

The invention will be better understood with the aid of the description of embodiments given by way of examples and illustrated by the figures, in which.

DETAILED DESCRIPTION OF POSSIBLE EMBODIMENTS OF THE INVENTION

Figure 1:
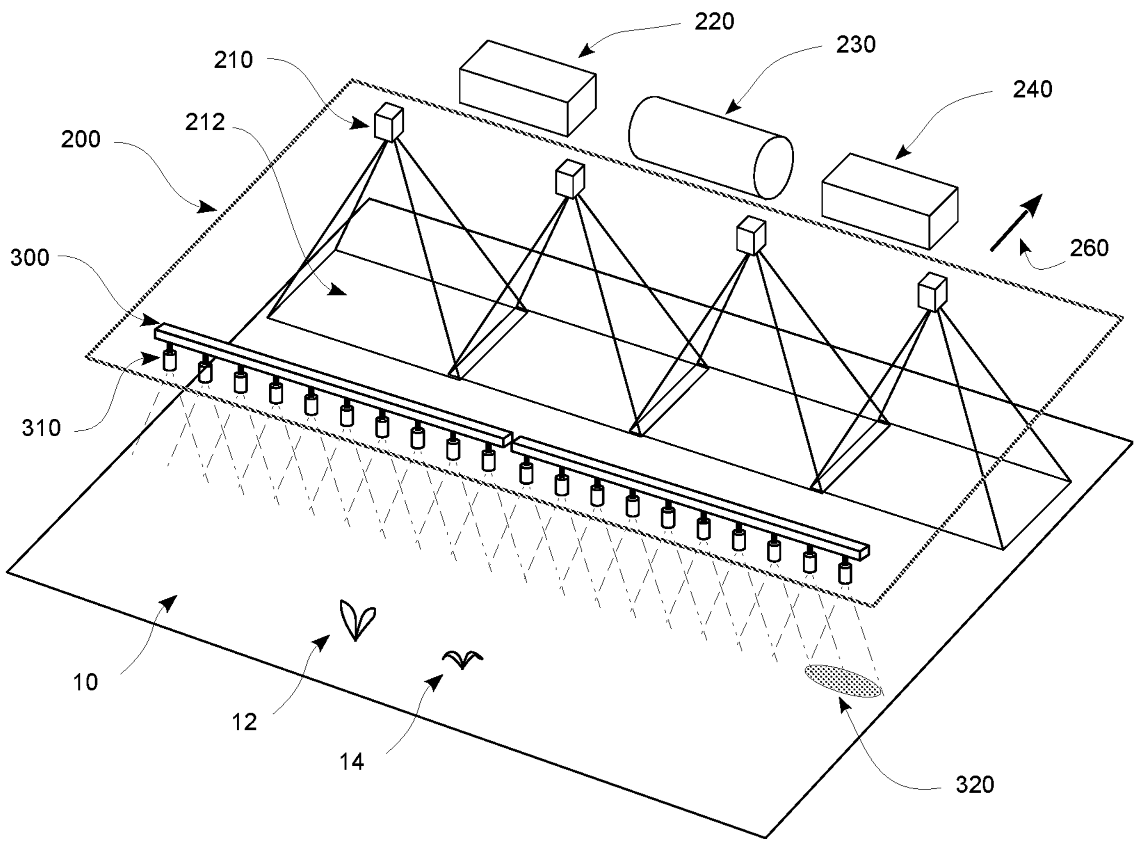
FIG. 1 shows a schematic perspective view of an agricultural spraying system according to an embodiment.

With reference to FIG. 1, the agricultural spraying equipment 200 according to an embodiment comprises several imaging devices 210 covering each an observation field 212 to detect on a cultivated field 10 cultivated plant 12 and non-cultivated plant 14 such as weeds. The spraying equipment 200 further comprises a spray bar 300 trailing the imaging devices 210. The spray bar comprises a plurality of electromechanical nozzles 310, from example between 20 to 50.

Figure 2:
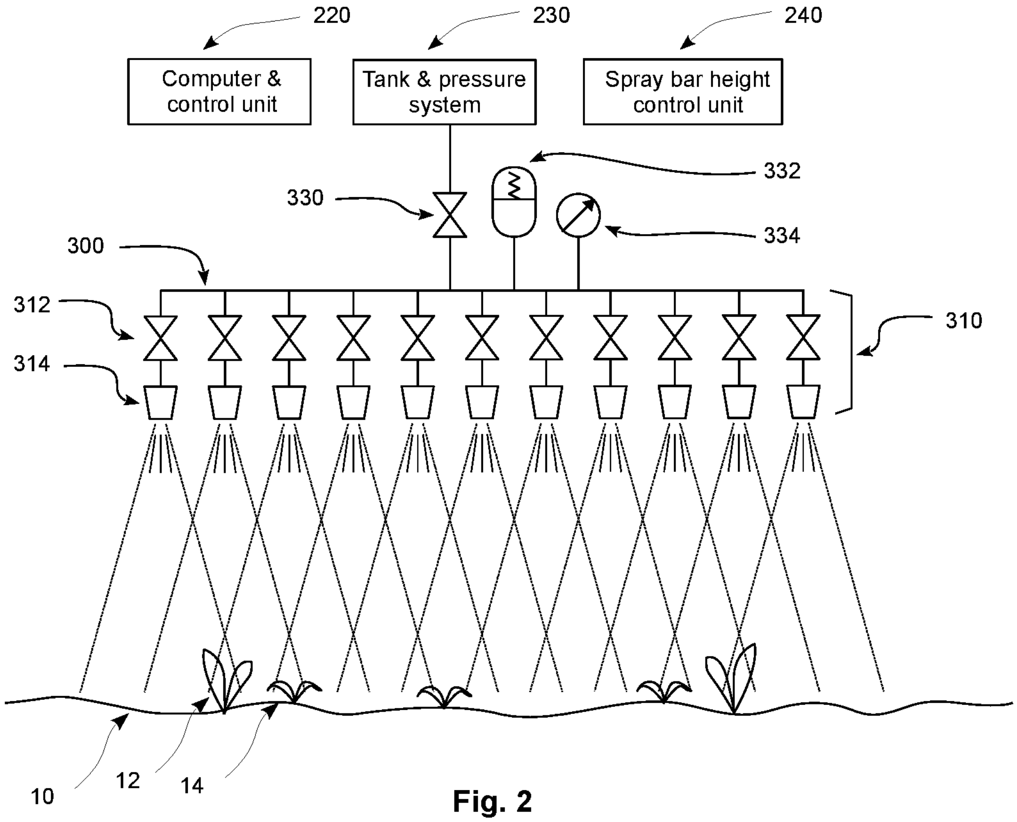
FIG. 2 shows a schematic front view of a spray bar of a spot spraying system according to an embodiment.

Referring to FIG. 2, which shows the agricultural spraying equipment 200 where one spray bar sector is shown, each electromechanical nozzle 310 comprises a nozzle 314 and electromechanical valve 312 configured to be switched on/off rapidly and with great timing accuracy in order to control the jet flow of the nozzles 314. These nozzles feature a (mostly laterally) diverging jet so as to apply micro-droplets over a given area located at a certain distance. Several of the nozzles are assembled in a row, and separated by a given distance, usually uniform and called the nozzle-to-nozzle pitch distance, to form the spray bar 300. The spray bar is placed parallel to the area to be sprayed. Several spray bars can be assembled together to extend the spraying working width of the system The spray bar 300 is in fluid communication with a tank and pressure system 230 adapted to provide the liquid to be sprayed at the desired pressure to the spray bar 300 through a spray input electromechanical valve 330 whose output forms a common inlet to the plurality of the electromechanical nozzles 310 which are separated from each other by a constant pitch along the spray bar. A pressure buffer 332 and a pressure sensor 334 is in fluid communication with the spray bar 300 downstream of the spray input electromechanical valve 330.

The agricultural spraying equipment 200 further comprises a control unit 220 to control the electromechanical valve 314 of the nozzles 310 to timely switch the nozzles on/off as a function of the plant 12 and non-cultivated plant 14 detected by the imaging devices 210. The control unit 220 is in communication with a spray bar control unit 210 which senses the distance from the spray bar 300 to the ground as to control an actuator to lower or lift the spray bar at a desired distance as a function of the area to be sprayed which is computed by the control unit 220 in real-time as a function of the plant 12 and non-cultivated plant 14 (e.g. weed) detected by the imaging devices 210.

The agricultural spraying equipment 200 allows to control the distance separating the spray bar 300 and the area on the cultivated field 10 to be sprayed. Generally, this area is the cultivated ground, but it can also be a vertically-cultivated structure, or a vertical plant with lateral features to be sprayed. Although other angles are possible, the nozzle jet is usually perpendicular to the area to be sprayed. The spray bars are mounted on a moving vehicle, with a bar direction perpendicular to the vehicle movement direction, and the spray application occurs when the nozzles displace over the area to be sprayed at a speed which can be controlled by the agricultural spraying equipment 200.

A first aspect of the invention deals with the control of which nozzles to be activated in order to spray some parts of the target ground, but avoid spraying some other nearby parts. The invention is to take into account the knowledge of the distance from nozzle to object, and the jet divergence angle, to activate the good nozzles in order to avoid spaying unwanted objects. Normally, the nozzles 350 located directly at the vertical of the object to be sprayed are selected for spraying. However, due to the divergent angle of the spray, the resulting operation will lead to spray the nearby objects, for instance a plant. In order to avoid such unwanted spray, the selected nozzle 352 to be activated for spraying is taken at an opposed distance 354 corresponding to half the spray width at the ground level, called the lateral jet shift distance.

The embodiment includes a method to control the switching of each nozzle independently so as to apply a spray spot with high spatial accuracy and high doses control over a large doses dynamics, independently of the nozzle speed, nozzle distance to the target, and liquid pressure.

The embodiment includes a method to control the dose per unit area by using a variable number of nozzles per unit length. This implies that the height of the bar from ground is sufficient for having a homogeneous application and overlap ratio.

Figure 3A:
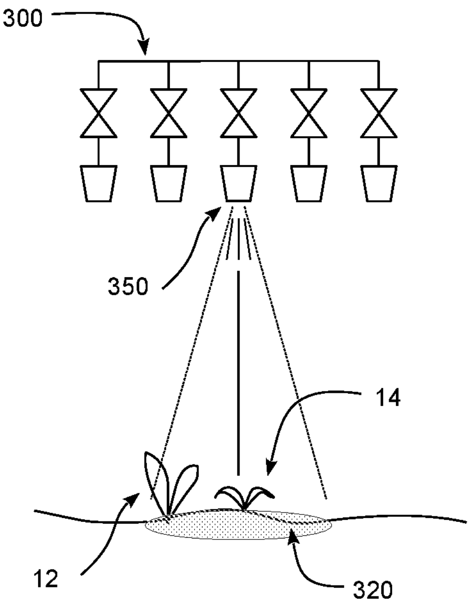
FIGS. 3*a* and 3*b* show schematic front views of a portion of a spray bar of FIG. 2 during respectively a first and a second spraying configuration as per the principle of lateral jet shift according to an embodiment.
Figure 3B:
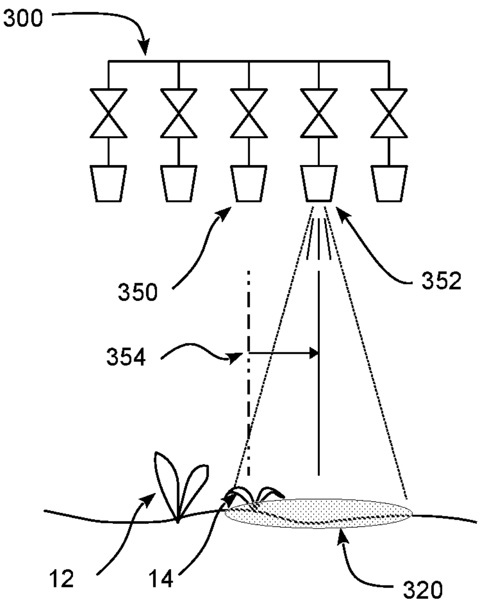

With reference to FIGS. 3*a* and 3*b*, when a non-cultivated plant 14, such weeds that needs to be sprayed is laterally adjacent to a cultivated plant 12 that shall not be sprayed, the distance from nozzle to the target plant, as well as the divergence of the jet are used to compute a lateral shift 354 of the jet. The lateral shift 354 is the distance which corresponds to a number of times the nozzle-to-nozzle pitch distance. Instead of activating the nozzle 350 located vertically to the target plant 14, the next nozzle 352 whose distance to the vertical nozzle 350 corresponds to the lateral shift distance 354 is selected for spraying. As a consequence, the spraying pattern 320 on the ground is shifted such that it does not longer extend on the cultivated plant 12.

The next table gives the obtained dose in function of some opening and closing patterns of the nozzles. Obviously, the larger the pattern, the higher the spray bar from ground it must be to maintain homogeneous application. The right column gives the minimal height of the spray bar by multiple of the minimal height for optimal overlap for the case when all nozzles are active.

| Pattern size | Pattern | Doses | Minimal height |
|---|---|---|---|
| 1 | 1 1 1 1 | 100% | 1x |
| 4 | 1 1 1 0 | 75% | 4x |
| 3 | 1 1 0 | 66% | 3x |
| 2 | 1 0 | 50% | 2x |
| 3 | 1 0 0 | 33% | 3x |
| 4 | 1 0 0 0 | 25% | 4x |

Figure 4A:
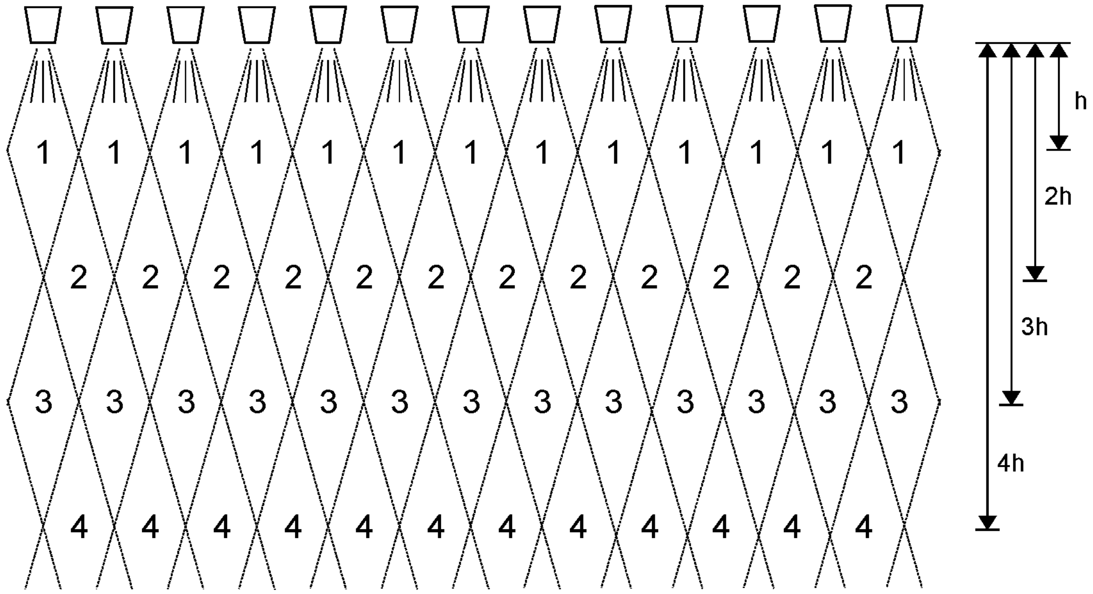
FIG. 4*a* shows a schematic front view of the nozzles of the spray bar when all nozzles are activated as per one operational configuration according to an embodiment.

These different pattern configurations are schematically shown in FIGS. 4*a* to 4*d*. FIG. 4*a* shows the nozzles of the spray bar or of a portion of the spray bar when all nozzles are activated (100% of the flow per spray bar unit length), corresponding to a nozzle density pattern of 1111. The numbers indicate the number of jets participating to spraying. This corresponds also to the jet overlap ratio. An overlap ratio of 2 is obtained at a distance 2 h, an overlap of 3 is obtained at a distance 3 h, etc. Application homogeneity is obtained at distances h, 2 h, 3 h, 4 h for overlap ratios of 1, 2, 3, 4 respectively.

Figure 4B:
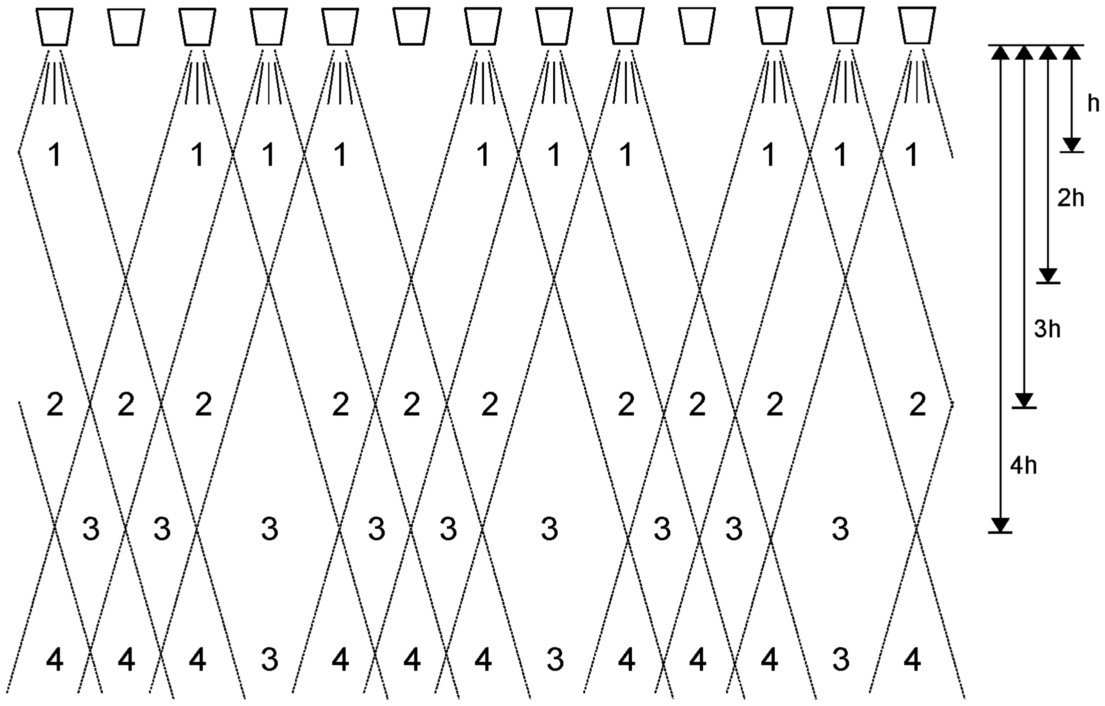
FIG. 4*b* shows a schematic front view of the nozzles of the spray bar when three out of four nozzles are activated as per another operational configuration according to an embodiment.

FIG. 4*b* is similar view of FIG. 4*a*, but with 3 nozzles over 4 spraying (75% of the flow, pattern 1110). Application homogeneity is obtained at a distance 4 h for an overlap ratio of 3.

Figure 4C:
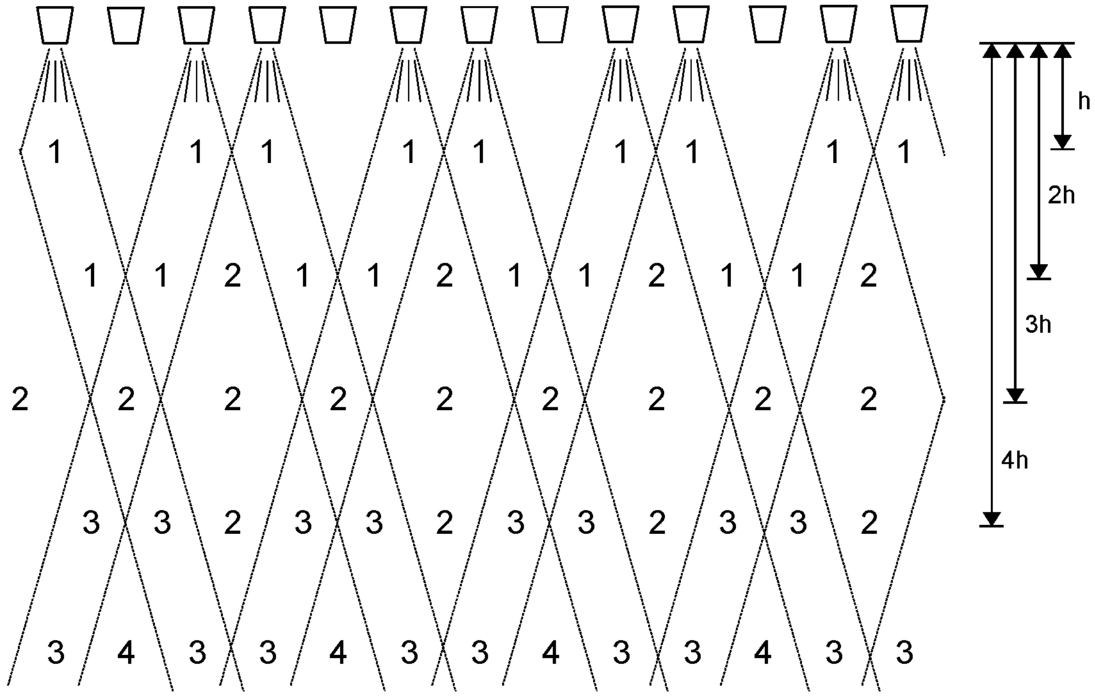
FIG. 4*c* shows a schematic front view of the nozzles of the spray bar when two out of three nozzles are activated as per another operational configuration according to an embodiment.

FIG. 4*c* is a similar view of FIG. 4*b*, but with 2 nozzles over 3 spraying (66% of the flow, pattern 110). Application homogeneity is obtained at a distance 3 h for an overlap ratio of 2.

Figure 4D:
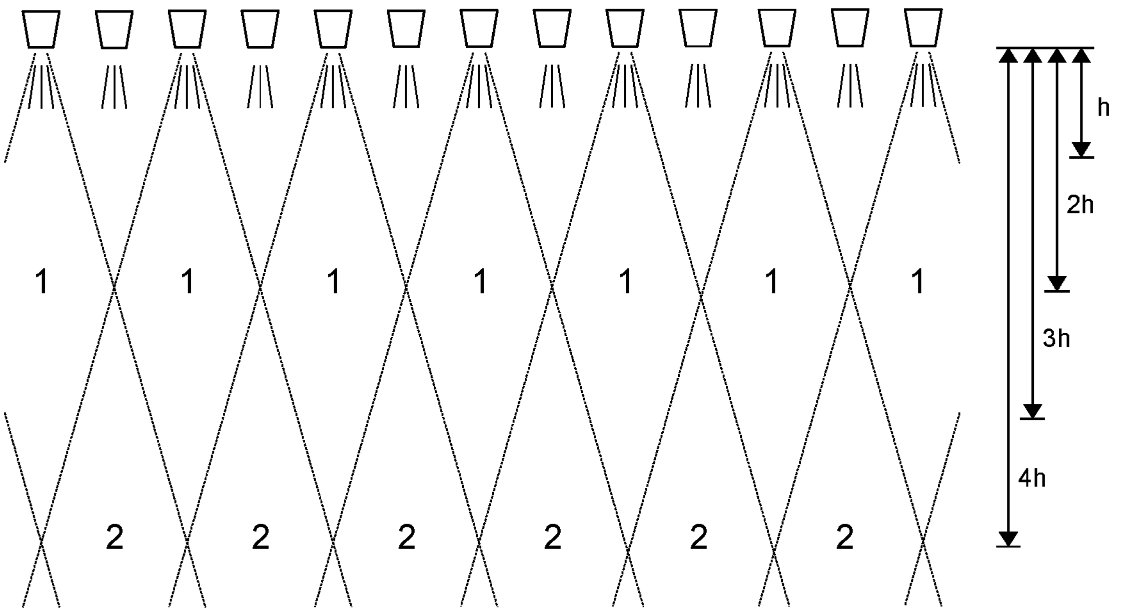
FIG. 4*d* shows a schematic front view of the nozzles of the spray bar when one out of two nozzles are activated as per another operational configuration according to an embodiment

FIG. 4*d* shows a similar view of FIG. 4*c*, but with 1 nozzle over 2 spraying (50% of the flow, pattern 10). Application homogeneity is obtained at a distance 2 h and 4 h for an overlap ratio of 1 and 2, respectively.

Another aspect of the invention is to use height to modulate the doses. The height is normally not used for doses control because, in a standard spray bar, it influences the overlap but the doses per unit length is given by the nozzle density and flow. However, for spot spraying, the dose per unit area is more directly controlled by the height, which impacts the area of the jet.

Figure 5:
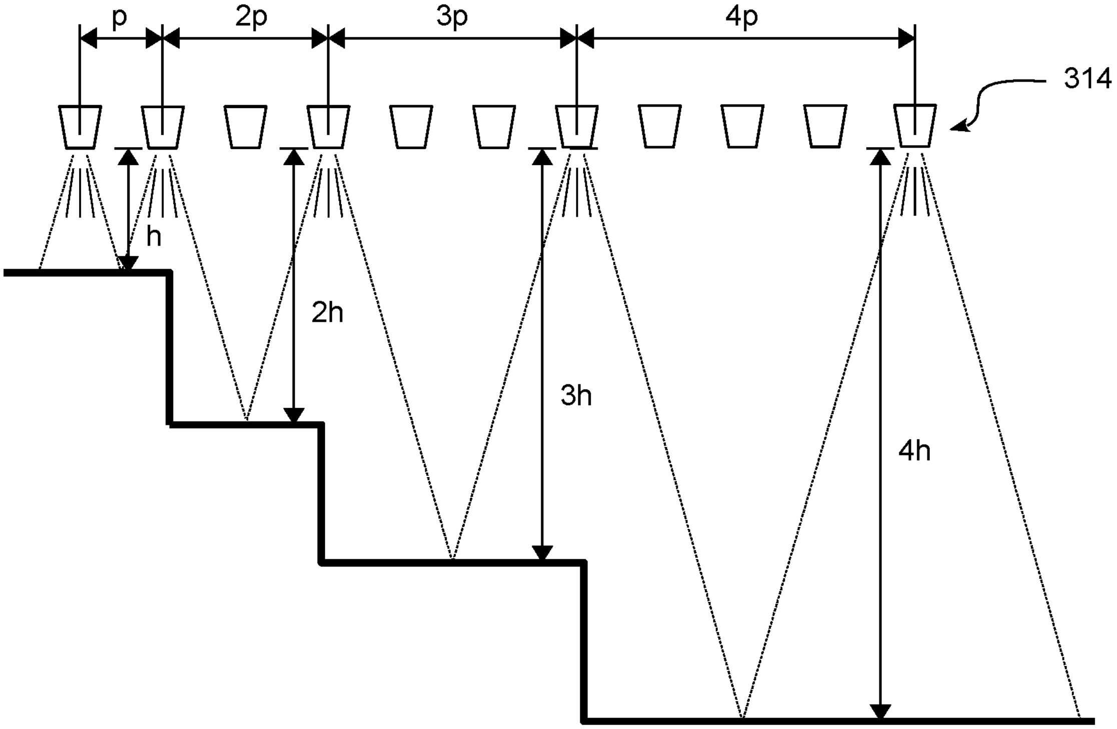
FIG. 5 shows a schematic front view of the spray bar portion with activated and non-activated nozzles as a function of the distance of the nozzles from the ground and the desired overlap ratio according to an embodiment.

With reference to FIG. 5, the relation between the pattern of activated nozzles and their respective distance from the ground is shown From left to right: First, two adjacent nozzles are activated (distance p between active nozzles). In order to spray the whole ground without jet overlap, the distance from nozzle to ground must be h. Second, two nozzles are activated with a separation distance 2p. In this case, the vertical nozzle to ground distance must be 2 h to get complete ground jet coverage without jet overlap. Third, the nozzle distance is 3p and therefore the ideal height must be 3 h. Finally, on the right, the nozzle distance is 4p and the nozzle to ground distance must be 4 h to get complete ground spray without overlap.

Another aspect of the invention is to combine PWM with spray overlap and use speed and height information to tune PWM ratio. One popular method to modulate the dose of a spraying system is to adopt a fast switch on/switch off operation of the nozzles. By playing on the ratio between the on and off state (pulse width modulation), the flow rate can be changed. One aspect of the invention is to use PWM in combination with spray overlap ratio to control the dose per unit area. This allows to add more granularity on the dose control for a given speed, given height, and given spray overlap pattern.

The next Table shows a possible combination of spray overlap patterns and PWM ratios to guarantee a continuous doses control between 33% and 100% of the doses for a given speed. The height must be minimum 3× the height required for having no overlap with all nozzles active.

| Pattern | Pattern ratio | PWM ratio | Obtained doses |
|---|---|---|---|
| 100 | 0.33 | 0.60 | 0.20 |
| 100 | 0.33 | 0.75 | 0.25 |
| 100 | 0.33 | 0.90 | 0.30 |
| 10 | 0.5 | 0.70 | 0.35 |
| 10 | 0.5 | 0.8 | 0.40 |
| 10 | 0.5 | 0.9 | 0.45 |
| 10 | 0.5 | 1.0 | 0.50 |
| 110 | 0.66 | 0.83 | 0.55 |
| 110 | 0.66 | 0.91 | 0.60 |
| 110 | 0.66 | 0.98 | 0.65 |
| 1 | 1.00 | 0.7 | 0.70 |
| 1 | 1.00 | 0.75 | 0.75 |
| 1 | 1.00 | 0.8 | 0.80 |
| 1 | 1.00 | 0.85 | 0.85 |
| 1 | 1.00 | 0.9 | 0.90 |
| 1 | 1.00 | 0.95 | 0.95 |
| 1 | 1.00 | 1.00 | 1.00 |

Figure 6:
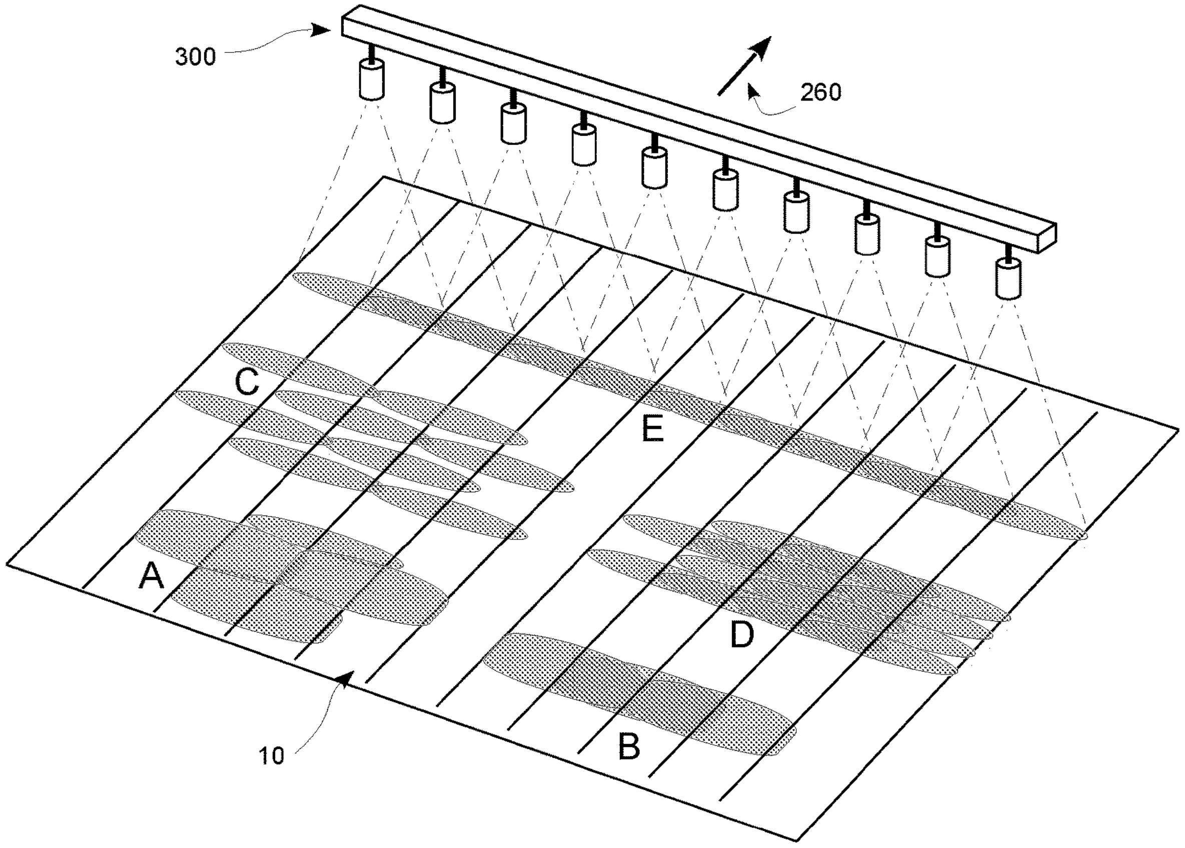
FIG. 6 shows a schematic perspective view of the spray bar of the spot spraying system with different spraying patterns according to an embodiment.

In an embodiment as shown in FIG. 6, the vertical distance between a distal end of a nozzle, connected to the spray bar 300, and the ground makes the lateral spot spray dimension to be twice the nozzle-to-nozzle pitch. The spraying pattern A shows a case where jet overlap is avoided, and where spot spraying is done using spatial combination of several continuous jet operation, whose overall width corresponds to the width of the object to be sprayed. The spraying pattern B shows a case of a spot spray where jet overlap of factor 2 is desired and obtained in the middle of the spot. The spraying pattern C is obtained by adjacent PWM jets showing no lateral overlap between them, and all aligned laterally. Between successive PWM pulses, the activated nozzles are laterally shifted by one unit (interleaved spot spraying) to provide better jet homogeneity. The spraying pattern D is obtained by interleaved PWM pulses with a jet overlap of factor 2. The PWM duty cycle is chosen as shorter than in example C. The spraying pattern E is obtained when all the nozzles are switched on at the same time, making a spray line. If the nozzles are kept switched on, a continuous jet operation is obtained like in a conventional sprayer (no spot spraying).

Another aspect of the invention is to use interleaving (or lateral shifting of the selected nozzle) between two successive PWM pulses to better homogenise the doses. One problem with PWM is that the flow becomes interrupted, resulting in loss of homogeneity in the applied doses. To help reducing this effect, one aspect of the invention is to laterally shift the spray pattern by one nozzle pitch between two PWM pulses, so as to obtain an interleaved (or mosaic) position of the spot centres, resulting in better homogeneity. This method can also be used without PWM and serves to better position the sprayed shape laterally, by increments of one nozzle pitch. This method can be used with different PWM ratios between two successive commutations, further increasing the dynamics of the dose control.

Another aspect of the invention is to use interleaving PWM with longitudinal jet overlap to better homogenise the doses. The above implement can indeed be combined with jet overlap to control the doses. This is obtained by letting a longitudinal overlap between two consecutive (and therefore interleaved) spray patterns. This allows to increase the range of doses control. The distance between nozzle and ground creates inevitably some drift of the droplets, which helps in rendering the doses per unit area homogeneous.

Another aspect of the invention is to control and manage spray extension around a given target in a spot spraying application. A target to be sprayed, for instance a plant, must sometimes be totally covered by spray spots. To ensure this is the case even with the possible positioning errors, the system must spray with a defined radial extension of the spray zone around and outside the target. By this way, it is ensured that the whole target area is sprayed even in the presence of errors in the opening/closing timing of the nozzles, or errors in the lateral position of the nozzles.

The same can be applied with a radial reduction of the target zone, resulting in an application strictly contained inside the target area. This is required for instance when the application shall guarantee that a sprayed product reaches one target, and only one target, ensuring that it will not be applied on the background or outside the target area. Reducing radially the target boundaries, the sprayed spot is fully contained inside a plant feature area (for instance a leaf).

Yet another aspect of the invention is to apply a buffer (exclusion) zone around targets that should not be sprayed, to be sure that, even with some spraying imprecision, no spot spray will touch the plant located inside the buffer zone. A buffer zone can be defined around an object, with an exclusion function. This means that we want to avoid absolutely to spray the object. The spray system can therefore define a geometry surrounding a defined target geometry of arbitrary shape, with a constant overlapping distance. This «buffer» geometry is then used as exclusion zone for the spray system.

Figure 7A:
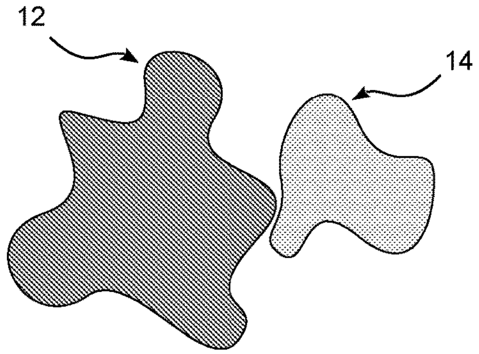
FIG. 7*a* shows a schematic top view of a portion of a field to be sprayed with a plant to be sprayed (targeted plant) and a plant not to be sprayed (non targeted plant) according to an embodiment.
Figure 7B:
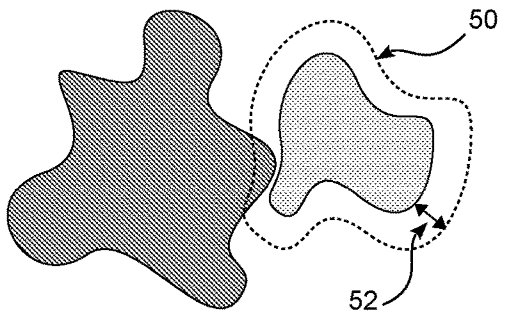
FIG. 7*b* shows a schematic top view of an adjoining zone surrounding a targeted plant for an extended spraying zone according to an embodiment.
Figure 7C:
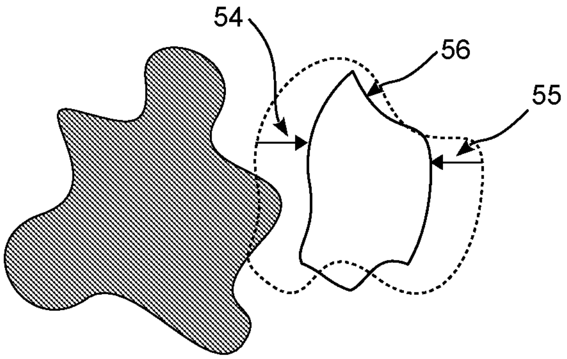
FIG. 7*c* shows a similar view of FIG. 7*b* with the extended spraying zone whose dimensions are laterally reduced by a distance corresponding to a lateral jet shift according to an embodiment.
Figure 7D:
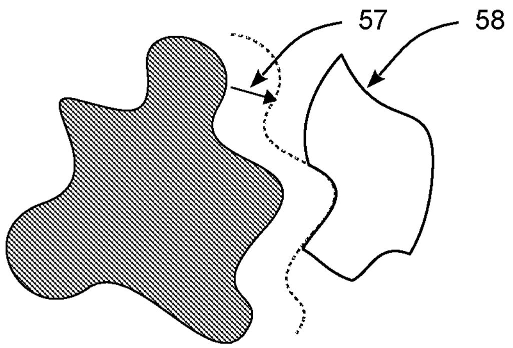
FIG. 7*d* shows a similar view of FIG. 7*c* with the reduced extended spraying zone further reduced by a buffer distance around a plant not to be sprayed according to an embodiment.
Figure 7E:
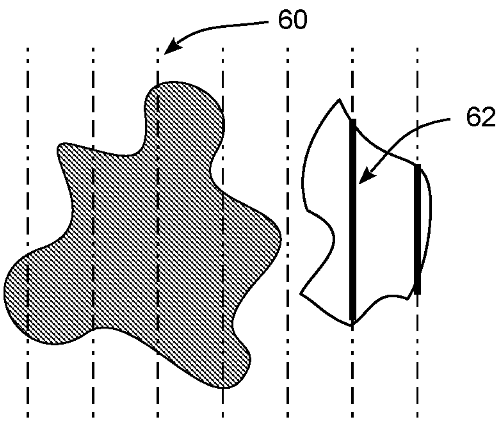
FIG. 7*e* shows the trajectory of the nozzles with the activated zones defining the spray map.
Figure 7F:
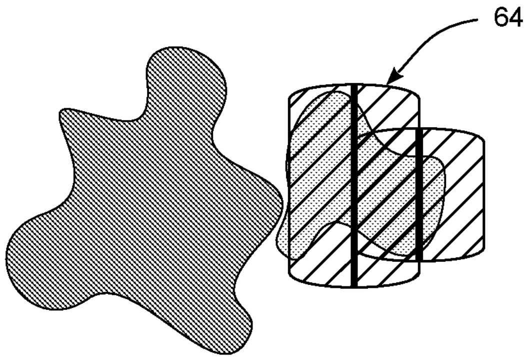
FIG. 7*f* shows the resulting spray pattern after transforming the spray map into nozzle opening/closing states (state vectors)

FIGS. 7*a* to 7*f* show different spray approaches according to this aspect. For example, FIG. 7*a* shows a top schematic view of a portion of a field with one plant to be sprayed 14, and one plant not to be sprayed 12. FIG. 7*b* shows the shape to be sprayed which is radially extended by a distance 52 to give an extended zone 50 to be sprayed. FIG. 7*c* shows the extended zone, which is laterally reduced by a lateral distance 54, 55 corresponding to the lateral jet shift distance. FIG. 7*d* shows the resulting shape which is further cropped by a safeguard buffer distance created around the object not to be sprayed, thus preventing jet to touch it. FIG. 7*e* shows the intersection of the shape to be sprayed with the trajectories of the nozzles over the field, forming the segments 62 during which nozzles are activated. FIG. 7*f* shows the resulting spraying patterns 64 with the two nozzle activation segments.

Figure 8:
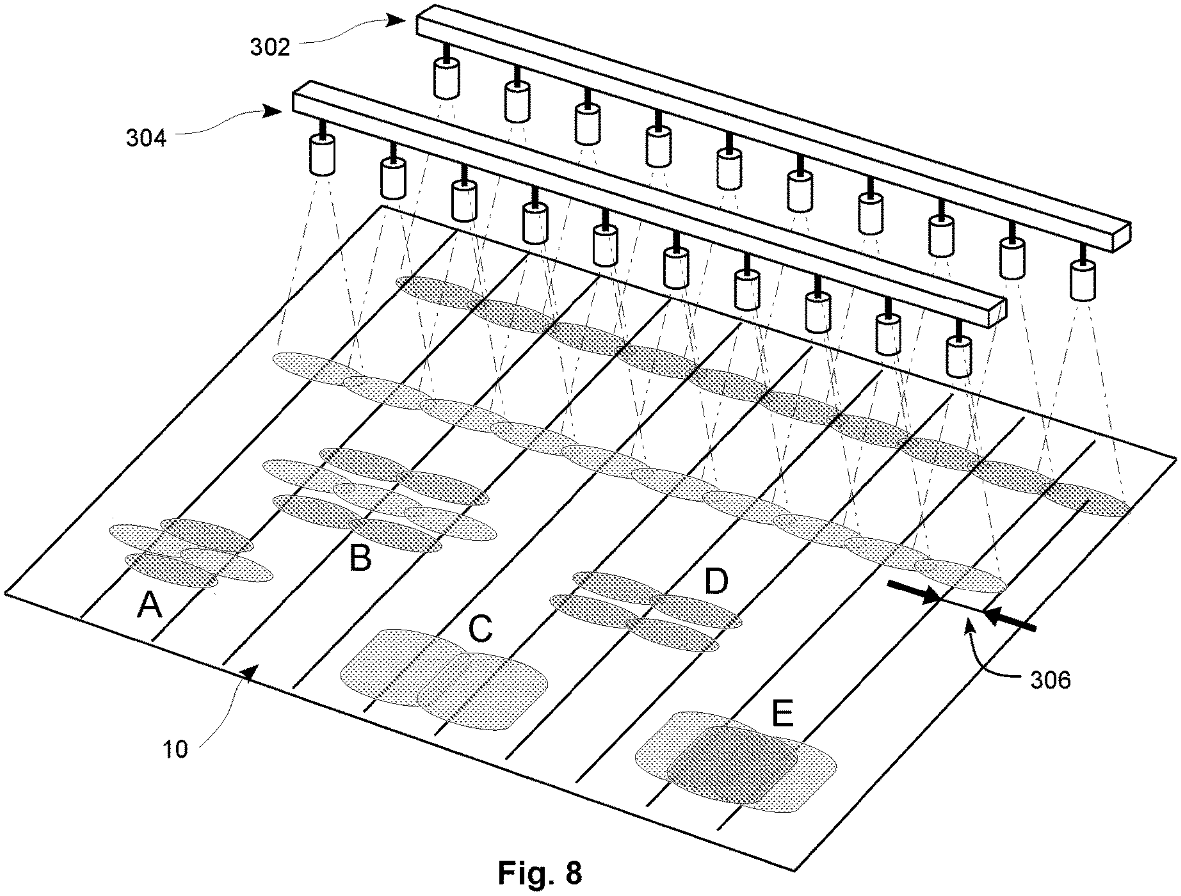
FIG. 8 shows a schematic perspective view of the dual-mode spot spraying system equipped with two spray bars according to an embodiment.

According to an embodiment shown in FIG. 8, a combination of two spray bars having the same nozzle pitch distance is used in proximity and parallel to each other. The second bar 304 is shifted laterally by half a nozzle pitch distance 306 from the first one 302. This implementation allows to operate the spray system in a so-called dual-mode spraying. In the first mode, the two spray bars operate independently from each other, and spray different products at different locations. They can operate both in continuous spray mode, or both in spot spraying mode, or the first in spot spraying mode and the second in continuous mode, or vice-versa. In this mode, both bars can be regulated independently in terms of doses per unit area, bar height, bar pressure, as each bar has its own pressure system. In the second mode, the two spray bars are operated together and spraying the same liquid at the same pressure; the lateral shift of half a nozzle pitch between the two bars allows to reduce by a factor 2 the lateral distance between two nozzles, thus improving the lateral spray spatial resolution by a factor 2. The fact that the nozzles are not placed on a single line must be compensated by proper timing decay between the opening of the first and second bar nozzles. Several spraying examples obtained with the dual-mode spraying are illustrated. To obtain the spraying patterns A and B, the two bars are combined to do spot spraying with different PWM duty cycles. To obtain the spraying patterns C and D, they are used independently to spot spray independent targets. To obtain the spraying pattern E, they are used together to do spot spraying with maximal overlap ratio.

The above combination of two spray bars to increase lateral precision can be further extended to three or more spray bars, decayed each other by a third or a quarter of the nozzle pitch distance, respectively. In this case, the lateral precision is increased by a ratio corresponding to the number of spray bars.

Another aspect of the invention is to provide a method for constant control of the applied doses per unit area. This method can be operated in both continuous spray operation, or spot spraying operation. It can also be operated with a single spray bar, or with a combination of two spray bars shifted laterally by half a nozzle pitch, either working independently or together to form a doubled lateral resolution spray system.

Figure 9:
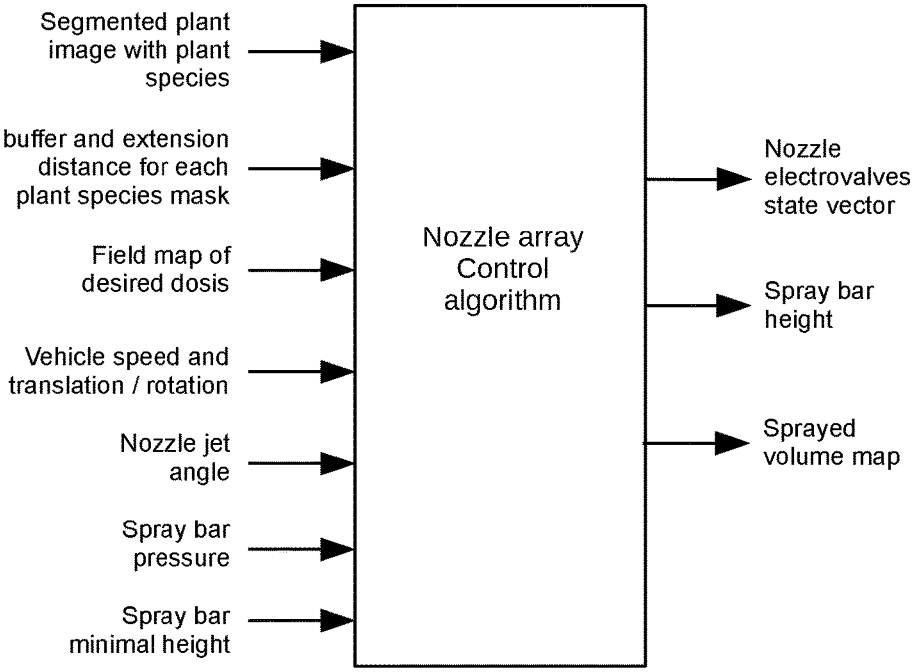
FIG. 9 shows a schematic view of a nozzle array control algorithm with input and output to control the spot spraying system according to an embodiment.

As shown in FIG. 9, the method takes as input a segmented plant image with plant species, with the basic spraying rules to be applied per plant, this means which plant species shall be sprayed or not sprayed, and with which liquid if the system is equipped with two or more different spray bars with different products in each bar. Then, it takes also as input the safeguard buffer and extension/reduction values for each plant species and for each product to be sprayed. It takes also as input the desired dose per unit area to be applied for each product to be sprayed (which can obey some local variation provided by a so called spraying modulation map). Finally, it takes as input a certain number of parameters having an effect on the applied dose per unit area, such as the minimal desired distance or height of each spray bar from ground or target, the vehicle movement and speed, the pressure of each spray bar liquid.

The method generates several outputs to control the dose to be applied. The main output is the nozzle electro-mechanical valve state vector which is a vector of ON/OFF state for each nozzle electro-mechanical valve of the controlled spray bar. The second is the spray bar height, which feeds the spray bar height control unit. The third is the sprayed volume map which gives the amount of liquid sprayed per unit area.

Figure 10:
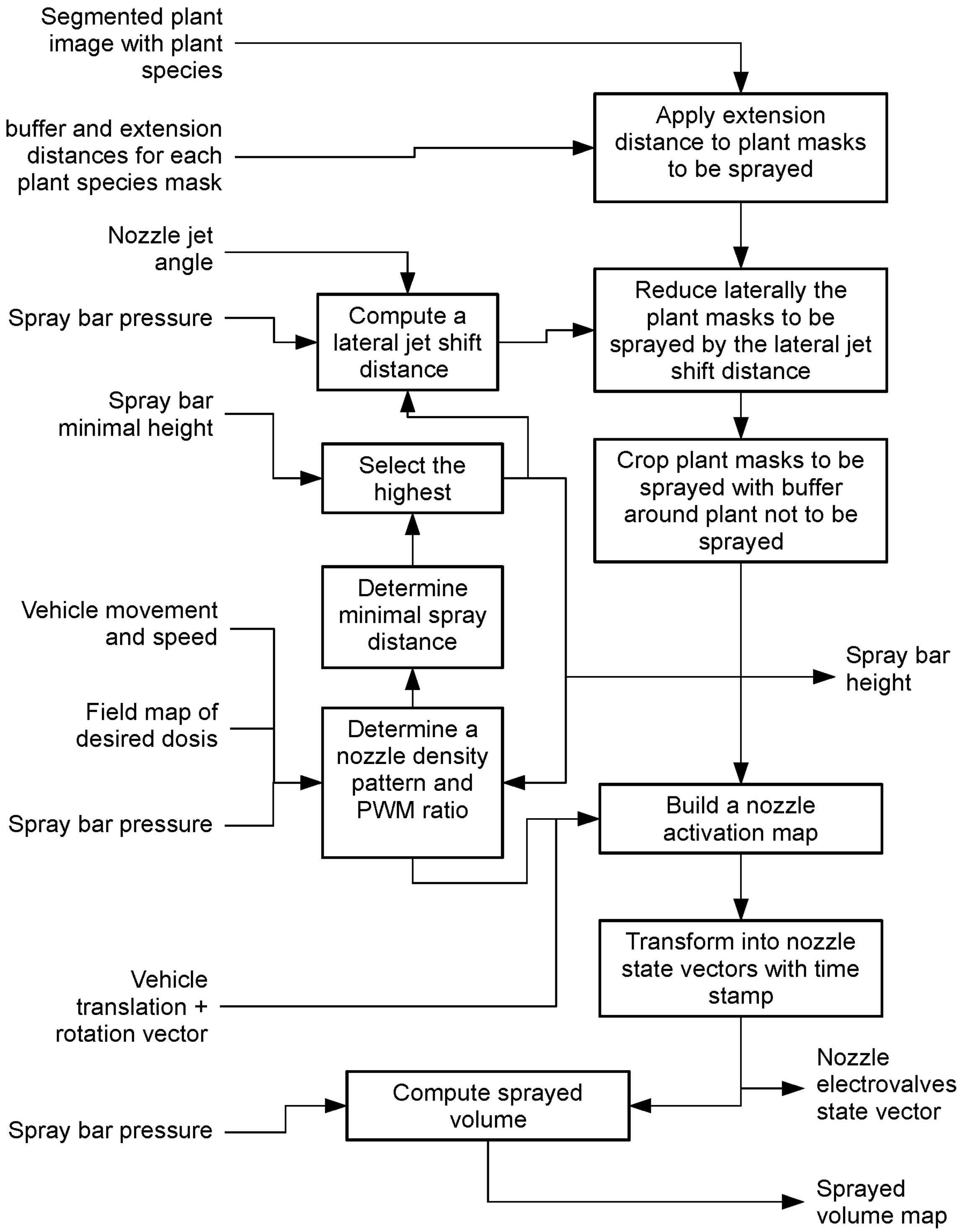
FIG. 10 shows the detailed diagram of the nozzle array control algorithm.

The method includes four main operations detailed below with reference to FIG. 10.

The first operation calculates the nozzle density pattern and the PWM ratio to apply the desired dose per unit area. This calculation uses the vehicle speed, the spray bar pressure and the desired dose to be applied (which can vary following a field map). The calculation first sets PWM to 60%, and selects the nozzle density pattern (all nozzles open, or three nozzles open over four, or two nozzles open over three, etc.) which provides the highest flow rate yet smaller than the desired one to get the expected dose at the operating speed and pressure and minimal spray bar height required by the user. Then, the height is increased if necessary up to the recommended height to provide homogeneous application with the selected nozzle density pattern. The corresponding dose is computed, and finally the PWM is computed (increased) to get the final required dose.

The second operation of the method computes a lateral jet shift distance to be used by the third operation. For this, it selects, among the spray bar minimal height (required by the user) and the spray bar resulting height from the nozzle density pattern, which one is the biggest. It uses this height value to compute a lateral jet shift distance based on the nozzle jet angle which slightly depends on the spray bar pressure.

The third operation of the method takes the input segmented image of the plants and generates a spray map from it. First, the operation applies the specified radial extension/reduction value on the object shapes to be targeted. Then, it reduces laterally the extended mask by the previously calculated lateral jet shift distance. Then, it applies safeguard buffer distances around non-targeted objects to prevent touching them, and crops the overlap mask if falling in this buffer zone. Then, it intersects this obtained cropped shape with the trajectories of the nozzles (whose density is doubled in case of dual-mode spray bar operation where the two bars are used together to increase the spatial resolution), to obtain segments of nozzle activations, on which the PWM and nozzle density pattern rules are applied to get the nozzle activation map. This latter is finally transformed into On/Off orders for the nozzle electro-mechanical valves (state vectors).

The fourth and last operation of this automatic dosing method is to compute, for a given unit area of the ground, the volume of liquid which has been applied, based on the final opening durations of the nozzle electro-mechanical valves and the pressure.

Figure 11:
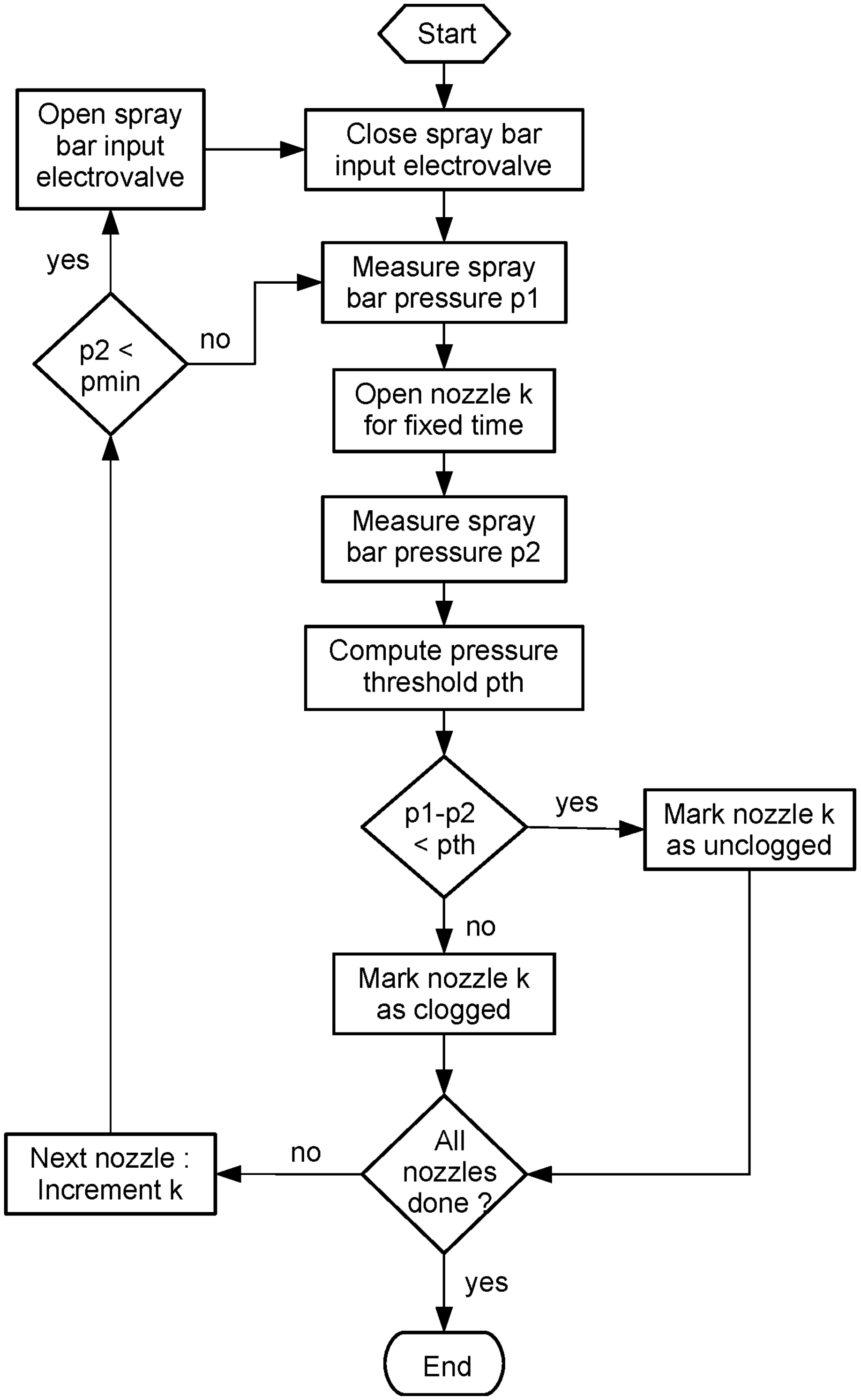
FIG. 11 shows the diagram of a nozzle clogging detection algorithm according to an embodiment.
Figure 12:
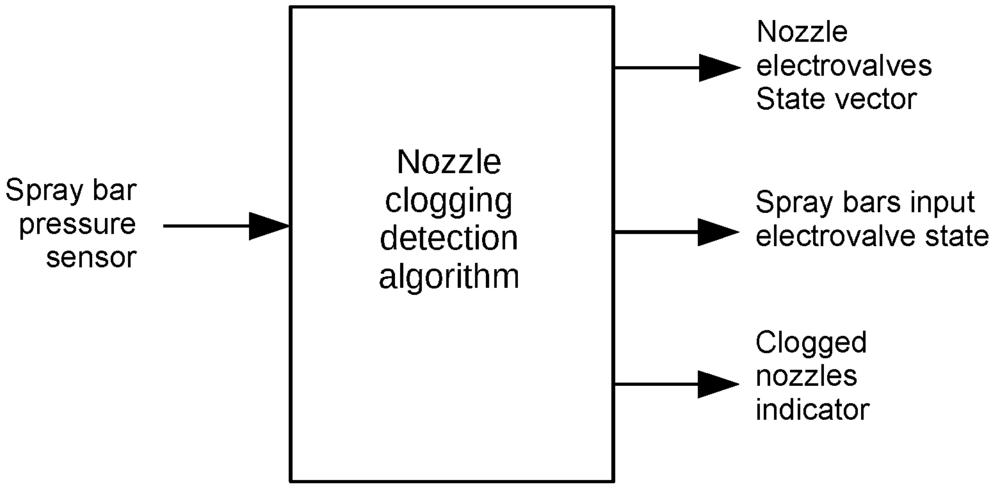
FIG. 12 shows a schematic view of the nozzle clogging detection algorithm with input and output to detect nozzle clogging according to an embodiment.

Another aspect of the invention is to provide a method to automatically control the clogging of the nozzles as shown in FIGS. 11 and 12. This method requires the usage of an electromechanical valve 330 at the spray bar inlet allowing to isolate the bar 300 from the incoming pressure system 230, it requires also the presence of a pressure buffer 332 mounted on the spray bar common liquid supply with relatively linear relation between pressure and volume, and it requires an accurate and linear pressure sensor 334 to measure the pressure in the spray bar. The method operates as follow, during a clogging control sequence. First, all the nozzles 310 are closed, the nominal pressure establishes in the bar, and the input electromechanical valve 330 is closed. Second, the liquid pressure is measured, before and after an opening time of a first nozzle. Knowing the expected nozzle flow, the opened duration and the pressure-volume relation of the pressure buffer, a theoretical pressure loss is calculated, and compared with the real pressure loss. If significantly smaller, the corresponding nozzle is considered as clogged, and recorded as such. The sequence repeats with all the nozzles of the bar, the bar pressure being regularly recharged with an opening pulse of the spray bar input electromechanical valve. At the end of the operation, the method provides a clogging information for every nozzle of the complete spraying system.

The invention claimed is:

1. Method of selectively spraying an area of a cultivated field with an agriculture spraying vehicle comprising a spraying equipment having at least one imaging system, at least one trailing spray bar aligned along a direction perpendicular to the direction of the agriculture spraying vehicle when operating, comprising a plurality of electromechanical nozzles being spaced apart from each other by a constant pitch distance, and configured to selectively spray said area, and including a corresponding plurality of nozzles and a corresponding plurality of electromechanical valves, the agriculture spraying equipment further comprising a tank and pressure system and a control unit including a processing unit to control the electromechanical valve of each electromechanical nozzle, the method comprising:

acquiring, by the at least one imaging system, an image of an area of the cultivated field and differentiating on the image, by the processing unit, a plant to be sprayed from a plant which shall not be sprayed;

determining at least one nozzle which is about to be vertically positioned above a plant to be sprayed;

computing a spraying pattern on the area based on a divergence angle of said at least one nozzle and a vertical distance between said nozzle and said area to be selectively sprayed, said spraying pattern covering the plant to be sprayed and possibly touching a plant which shall not be sprayed;

computing a distance called a jet shift distance to laterally shift the spraying pattern such that the shifted pattern covers the plant to be sprayed without covering the plant which shall not be sprayed, and express said jet shift distance as a multiple of said nozzle-to-nozzle pitch, and laterally shifting said spraying pattern by activating at least one newly selected nozzle which is distant from the at least one nozzle vertically positioned above a plant to be sprayed by said jet shift distance so that the spraying pattern from said at least one newly selected nozzle does not spray the plant that shall not be sprayed.

2. Method according to claim 1, wherein a mask defining the plant to be sprayed is radially extended in all directions by a radial distance to determine an extended zone to be sprayed to ensure that the corresponding plant will be correctly sprayed even in the presence of inaccuracy in the lateral position of the selected electromechanical nozzle(s) or in an opening and closing moment of said electromechanical nozzle(s).

3. Method according to claim 1, wherein a mask defining the plant to be sprayed is radially reduced in all directions by a distance to determine a reduced zone to be sprayed to ensure that the spraying pattern is contained inside the corresponding plant to be sprayed even in the presence of inaccuracy in the lateral position of the selected electromechanical nozzle(s) or in an opening and closing moment of said electromechanical nozzle(s).

4. Method according to claim 3, wherein lateral opposite sides of said reduced zone are reduced by a distance corresponding to said lateral jet shift distance to determine a laterally reduced spraying zone ensuring that the lateral jet divergence does not cause the spraying pattern to fall outside said reduced zone corresponding to the plant to be sprayed.

5. Method according to claim 4, wherein a buffer zone is computed around the plant which has been identified by the at least one imaging system as a plant that shall not be sprayed, wherein the buffer zone crops a portion of the reduced spraying zone to determine a further reduced spraying zone.

6. Method according to claim 1, wherein the control unit selects and opens one or more electromechanical valves of electromechanical nozzles as a function of:

said shifted pattern, the speed of the agriculture spraying vehicle, the height of the spray bar above the cultivated field, the pressure of the liquid in the spray bar provided by the pressure system, and the volume per unit area to be applied.

7. Method according to claim 1, wherein the electromechanical valves of said plurality of electromechanical nozzles are controlled to open the electromechanical nozzles to apply a dose volume ranging from 25% to 100% of the total doze according the either of the following configurations:

all nozzles of the spray bar are opened to spray 100% of the total dose;

every three adjacent spray nozzles of the spray bar are opened, wherein one spray nozzle is closed between each of said every three adjacent spray nozzles to spray 75% of the total dose;

every two adjacent spray nozzles of the spray bar are opened, wherein one spray nozzle is closed between each of said every two adjacent spray nozzles to spray 66% of the total dose;

every one out of two adjacent nozzles of the spray bar are opened to spray 50% of the total dose;

every one out of three adjacent spray nozzles of the spray bar are opened to spray 33% of the total dose, and every one out of four adjacent spray nozzles of the spray bar are opened to spray 25% of the total dose.

8. Method according to claim 1, wherein the selection and opening of said one or more electromechanical valves of the corresponding nozzle(s) is combined with pulse width modulation (PWM) to open the nozzle(s) so as to further modulate the spraying dose in order to increase the accuracy of the total applied volume per unit area.

9. Method according to claim 8, wherein the selection and opening of said one or more electromechanical valves of the corresponding nozzle(s) periodically change between successive PWM pulses, wherein one of two adjacent nozzles is open during a first PWM pulse while the other of said two adjacent nozzles is open during a second PWM pulse so as to obtain an interleaved spot spray pattern with an improved application homogeneity.

10. Method according to claim 1, wherein the spraying equipment comprises at least two spray bars arranged parallel to each other, each spray bar comprising a plurality of electromechanical nozzles, wherein the plurality of nozzles of each spray bar are spaced apart from each other by a constant pitch distance, and wherein one spray bar is laterally shifted from the other spray bar by a distance equals to half of said pitch distance.

11. Method according to claim 1, wherein the spraying equipment comprises at least three spray bars arranged parallel to each other, each spray bar comprising a plurality of electromechanical nozzles, wherein the plurality of nozzles of each spray bar are spaced apart from each other by a constant pitch distance, and wherein one spray bar is laterally shifted from one of the two other spray bars by a distance equals to a third of said pitch distance while said one spray bar is laterally shifted from the other of said two other spray bars by a distance equals to two thirds of said pitch distance.

* * * * *